United States Patent [19]
Natale

[11] Patent Number: 5,887,500
[45] Date of Patent: Mar. 30, 1999

[54] TOOL-CARRYING TURRET WITH STOPPING DEVICES PERFORMING AUTOMATIC CENTERING OF THE MEANS FOR LOCKING THE TURRET ITSELF

[75] Inventor: Mario Natale, Cologno Monzese, Italy

[73] Assignee: Baruffaldi S.p.A., San Donato Milanese, Italy

[21] Appl. No.: 805,432

[22] Filed: Feb. 25, 1997

[30] Foreign Application Priority Data

Feb. 18, 1997 [IT] Italy .............................. MI96 A 000456

[51] Int. Cl.⁶ ................................. B23B 3/00; B23B 7/00
[52] U.S. Cl. ................................................. 82/121; 82/159
[58] Field of Search ............................ 82/121, 158, 159; 409/231, 233

[56] References Cited

U.S. PATENT DOCUMENTS

| | | | |
|---|---|---|---|
| 3,580,129 | 5/1971 | Austin | 82/121 |
| 4,051,750 | 10/1977 | Berly | 82/121 |
| 4,467,680 | 8/1984 | Kettel | 82/159 |
| 4,704,926 | 11/1987 | Boffelli | 82/159 |
| 4,991,474 | 2/1991 | Thumm et al. | 82/159 |
| 5,007,314 | 4/1991 | Hafla et al. | 82/121 |

FOREIGN PATENT DOCUMENTS

| | | | |
|---|---|---|---|
| 0299556 A | 1/1989 | European Pat. Off. | 82/121 |
| 402298403 A | 12/1990 | Japan | 82/121 |

*Primary Examiner*—Daniel W. Howell
*Assistant Examiner*—Toan Le
*Attorney, Agent, or Firm*—Herbert Dubno

[57] ABSTRACT

A tool-carrying turret for lathes includes a fixed support body provided with a fixed toothed rim a rotatable toothed rim which has a tool-carrying plate (4) fixed to it and rotatable rigidly with an index disc mounted on a coaxial drive shaft of the turret, a stopping device operated by actuating devices and designed to cause stoppage in rotation of the index disc and relative centering of the toothing of the fixed rim and rotating rim at the end of the tool changing phase.

5 Claims, 2 Drawing Sheets

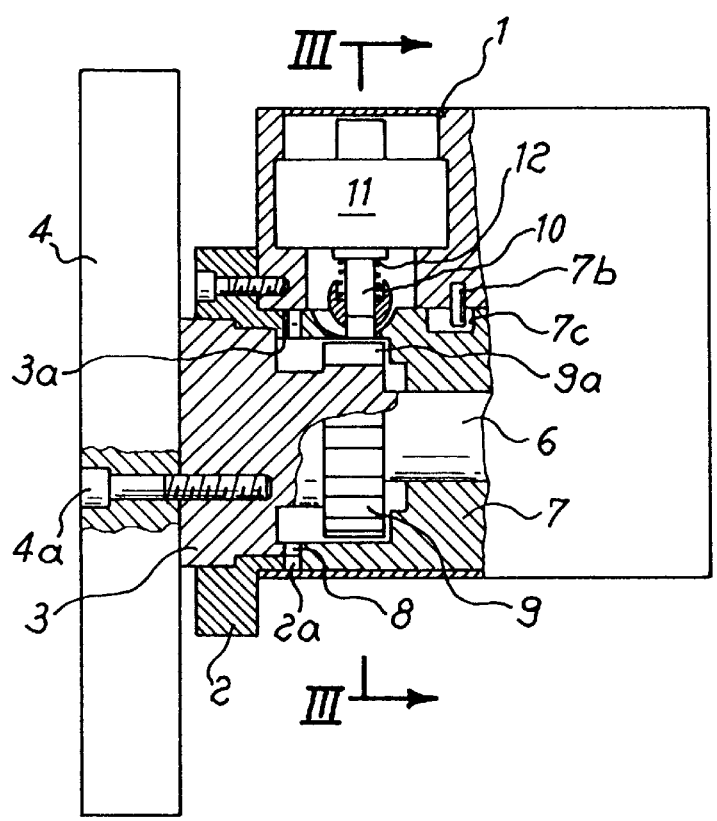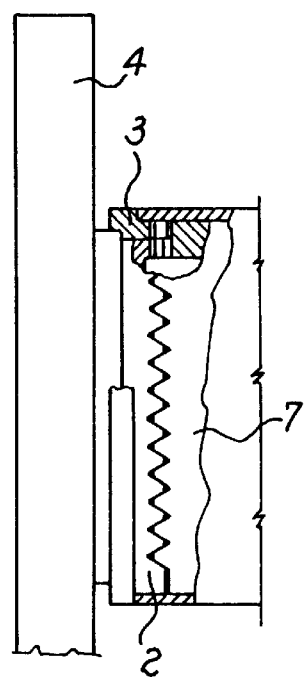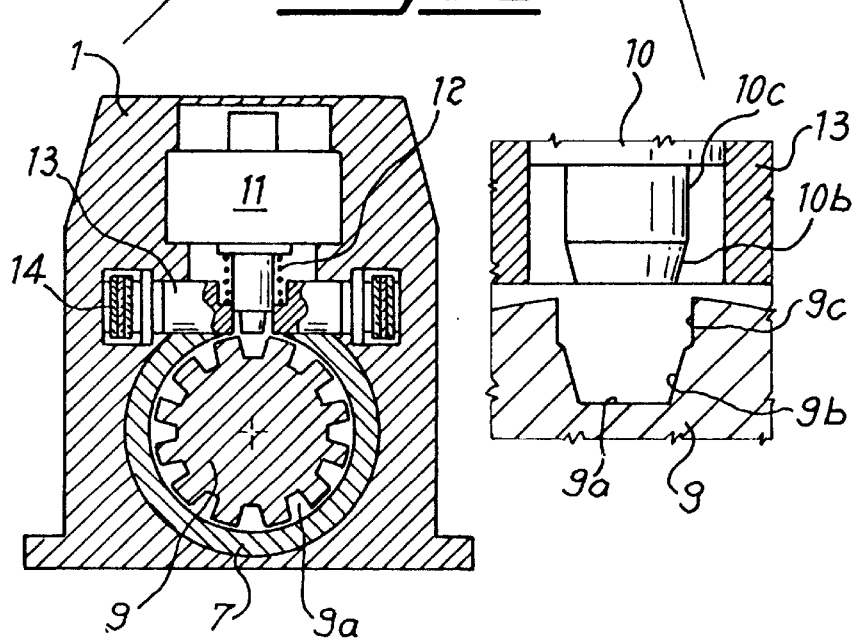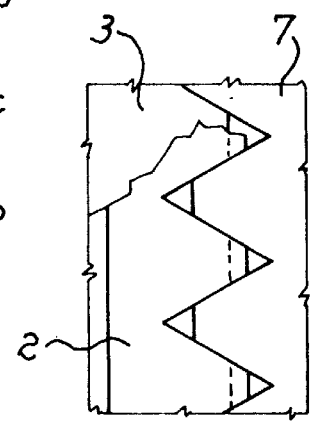

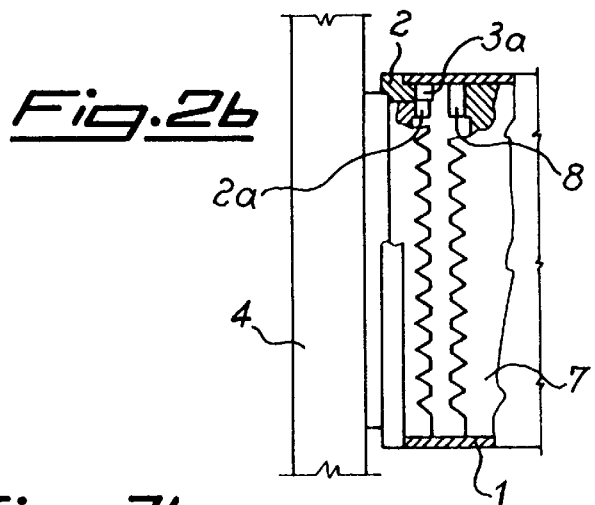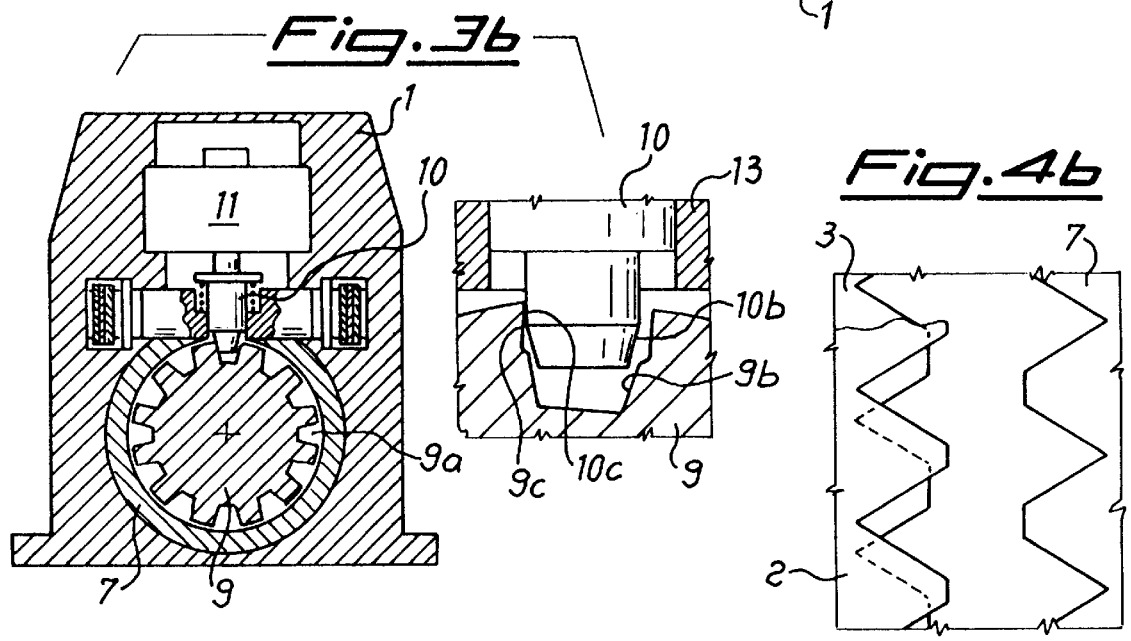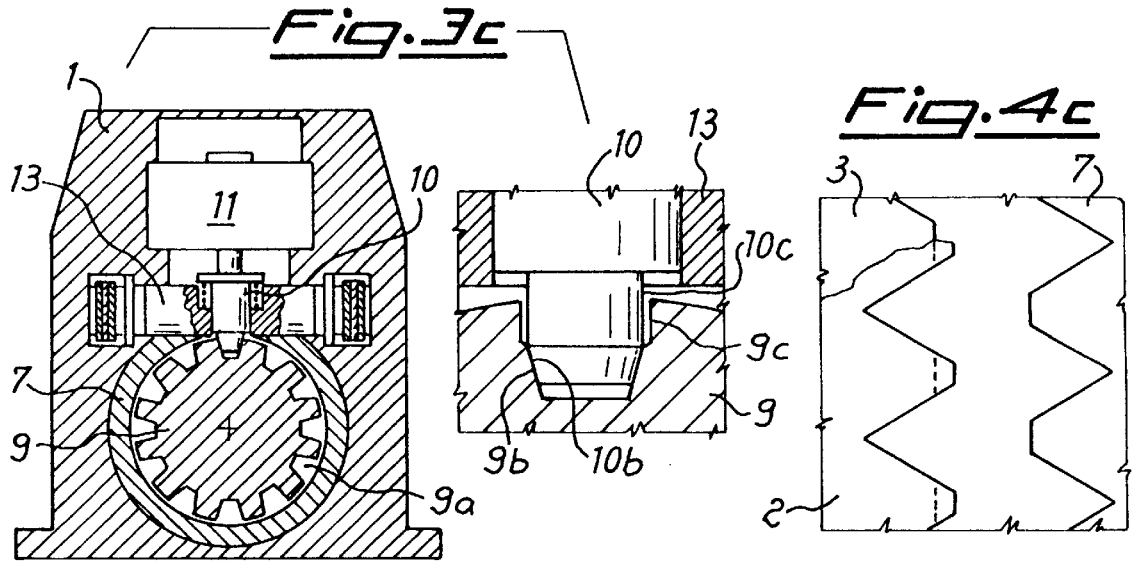

5,887,500

TOOL-CARRYING TURRET WITH STOPPING DEVICES PERFORMING AUTOMATIC CENTERING OF THE MEANS FOR LOCKING THE TURRET ITSELF

FIELD OF THE INVENTION

The present invention relates to a tool-carrying turret for automatic machine tool provided with devices for stopping rotation of the tool-carrying plate with automatic centering of the angular alignment of the means for locking the turret.

BACKGROUND OF THE INVENTION

Various mechanical operations for machining of a large number of workpieces can involve the use in succession, for the same workpiece, of several tools in a programmed and automatically controlled sequence.

For this purpose, the workpiece is usually mounted on a lathe or similar machining center which is provided with an auxiliary apparatus consisting of a turret carrying several tools which are arranged radially and/or frontally on a rotating plate, the controlled rotation of which brings the tool, pre-selected in each case, into the working position for carrying out the required machining of the workpiece.

A fundamental requirement which arises during such machining operations is the reduction in the idle time in particular due to the time required for changing the tool and resuming machining of the workpiece.

This idle time referred to herein as "cycle time" is substantial which is necessary for allowing the turret to perform all the movements designed to bring the new tool into the working position.

For this purpose, in fact, the turret requires a first "opening phase" for releasing itself from the fixed working position, a "rotating phase" for rotating in either direction, along the shortest path, until the new tool is arranged in the working position, and a "stopping and closing phase" for stopping and returning into the locked position.

These operations are performed, in the known turrets, using mechanical devices which transmit the rotation of an actuating motor to the rotating tool-carrying plate and perform at the same time actuation of the locking and release means which comprise, among other things, an index disc provided with radial seats which define the different positions which can be assumed by the tool-carrying plate, and two toothed rims, one fixed to the structure and one rotating with the tool-carrying plate, but axially fixed. The rims are locked together or released during the workpiece machining or tool changing rotation phases by means of a third toothed rim facing the other two, which, moving in an axial direction engages or disengages its own toothing with or from the toothing of the other two rims, causing relative locking or releasing thereof.

It is also known that, during the turret closing phase, the teeth of the two rims to be locked are not perfectly aligned since the devices of the traditional type provided inside the turret for stopping the rotating rim have a certain amount of play necessary for correct operation thereof in order to stop rotation of the tool-carrying plate.

Consequently, front coupling between the toothing of the locking rim and the toothing of the facing rims causes rotational driving of the rotating rim, which terminates when the locking rim is totally engaged on the fixed rim. Correspondingly, engagement of the rotating rim against the teeth of the stopping rim causes an impact which is transmitted to the structure, generating noise and the possibility of damage to the turret.

OBJECTS OF THE INVENTION

It is, therefore, a principle object of the invention to provide a tool-carrying turret having devices for stopping rotation of the tool-carrying plate.

Still another object of the present invention is to provide the device designed to reduce the noisiness of the turret during closing. By the approximation in the angular alignment of the teeth of the fixed rim with the teeth of the rotating rim.

Yet another object of the invention is to provide a positive drive system which is extremely precise and reliable to reduce the tool changing time.

SUMMARY OF THE INVENTION

These results are obtained according to the present invention by a tool-carrying turret for lathes or similar machining centers, comprising a fixed support body provided with a fixed toothed rim and a toothed rim which has a tool-carrying plate fixed to it and rotates rigidly with an index disc mounted on a coaxial drive shaft of the turret which also comprises a means operated by associated actuating devices and designed to cause stoppage in rotation of the index disc and relative centering of the toothing of the fixed rim and rotating rim, respectively, at the end of the tool changing phase.

BRIEF DESCRIPTION OF THE DRAWING

The above and other objects, features, and advantages will become more readily apparent from the description, reference being made to the accompanying drawing in which:

FIG. 1 is a schematic section along a vertical longitudinal plane of the turret according to the invention;

FIG. 2a is a partially sectioned side view of the turret according to the invention closed during the working phase;

FIG. 2b is analogous to FIG. 2a but shows the sectioned view of the turret open during the tool changing phase;

FIG. 3a is a section along lines III—III in FIG. 1 with a corresponding enlarged view illustrating the device for stopping the turret in the turret closed/turret open position;

FIG. 3b is a view analogous to FIG. 3a and showing the device in start stoppage/end stoppage;

FIG. 3c is a view analogous to FIG. 3a and 3b but showing the device in centering position; and FIGS. 4a, 4b and 4c show a schematic view of alignment of the three rims during the three phases shown in FIGS. 3a, 3b and 3c, respectively.

SPECIFIC DESCRIPTION

As can be seen from the drawing, the turret according to the invention consists of an external support body 1, comprising a fixed rim 2 provided with front toothing 2a.

The body 1 has rotatable inside it an additional rotating rim 3, to which the tool-carrying plate 4 of the turret can be connected by means of screws 4a; the rotating rim 3 is provided with front toothing 3a which is concentric with and adjacent to the toothing 2a of the fixed rim 2.

The rim 3 has connected to it in a known manner an index disc 9 rigid with the end of a shaft 6 rotating inside the body 1.

The shaft 6 has around it an axially movable locking ring 7 provided with front toothing 8 facing the toothing 2a, 3a and designed to engage therewith, resulting in coupling of the rotating rim 3 with the fixed rim 2. The index disc 9 and the ring 7 have arranged between them resilient means acting so as to keep the ring 7 axially at a distance from the disc 9 and therefore to have the toothing 8 disengaged from the toothing 3 and 5.

The ring 7 is also provided on its circumferential profile with a recess 7c cooperating with a stud 7b so as to prevent rotation of the ring 7 itself, but at the same time allow axial translation thereof.

The external body 1 has fixed inside it a drive motor known per se and therefore not illustrated. The entire actuating system of the turret is also known per se and therefore not described.

The index disc 9 rigid with the shaft 6 has, on its external circumferential surface, a plurality of radial notches 9a, the number and angular position of which correspond to the number of stoppage positions of the turret, i.e. to the number of tools carried by the tool-carrying plate 4 rigid with the rotating rim 3. More particularly, the notches 9a are formed angularly in phase with the toothing 3a of the rotating rim 3.

The body 1 of the turret also has housed inside it a radial pin 10 which is designed to be inserted into the notches 9a of the index disc 9 by the action exerted by an actuator 11, which is of the electromagnetic type in the example, against the thrusting action of a spring 12.

The pin has a longitudinal axis of symmetry angularly in phase with the toothing 2a of the fixed rim 2.

More in detail and with reference to FIG. 3a, the pin 10 is radially slidable inside a support bar 13 which is movable parallel to the longitudinal axis of the turret and the opposite ends 13a of which are in abutment with resilient buffers 14 for absorbing impacts and acting so as to bring the pin 10 always back into a central position radially aligned with the radial axis of symmetry of the recess 9a.

The free end of the pivot 10 has a profile variable in the radial direction and from the axis of the turret outwards, formed by a frustoconical surface 10b followed by a cylindrical surface 10c.

Correspondingly the recesses 9a of the index disc 9 have in turn an outermost cylindrical surface 9c and an innermost frustoconical surface 9b.

Operation of the turret and the associated means for stopping tool-changing rotation is as follows:

in the working condition (FIGS. 1, 2a, 3a and 4a) the turret is locked, i.e. the ring 7 is axially pushed towards the fixed rim 2 and rotating rim 3 so that the corresponding sets of toothing are meshed (FIG. 4a); correspondingly the pin 10 is kept outside the seat 9a of the index disc 9 by the thrusting action of the spring 12.

when machining has been completed, the tool changing phase starts (FIG. 2b), during which the ring 7 is axially disengaged from the fixed rim 2 and rotating rim 3. The latter is rotatable until the approach to the programmed angular position of the tool-carrying plate 4 is signalled via associated means.

At this point (FIG. 3b), the electromagnet 11 is excited and radially pushes the pin 10 inside the seat 9a when the latter positions itself opposite the pin itself.

During this first stoppage phase it is the respective cylindrical surfaces 10c and 9c which come into contact and ensure precise and reliable stoppage of the index disc 9 and hence the rotating rim 3. However, this contact between the cylindrical surfaces (FIG. 4b) does not ensure correct alignment of the toothing 3a of the rotating rim 3 with the toothing 2a of the fixed rim 2, and the pin 10 is therefore further pushed by the actuator 11 into the seat 9a of the disc 9 (FIG. 3c) so that the respective frustoconical surfaces 10b, 9b come into contact with one another and cause rotation of the rim 3 with respect to the rim 2 and consequent alignment of the respective teeth 2a, 3a (FIG. 4c).

Once alignment of the toothing 2a and 3a has been achieved, it is possible to perform axial translation of the ring 7, not encountering any obstacles along its path to cause locking of the turret (FIGS. 2a, 4a) without knocks and/or noisiness.

Many variations may be introduced, without thereby departing from the scope of the general features of the invention.

I claim:

1. A tool-carrying turret comprising:

an elongated support body extending along a body axis;

a drive shaft received in the body and rotatable about the body axis;

an index disc mounted rotatably fixed on a front end of the drive shaft and coaxial therewith;

a first rim fixed on the body and provided with a first toothing;

a second rim rotatable coaxially with the shaft and provided with a second toothing concentrical with and spaced radially inwardly from and adjacent the first toothing in the support body;

a tool-carrying plate mounted rotatably fixed on a front side of the second rim and adapted to carry a plurality of angularly spaced apart tools;

stop means surrounding the shaft for engaging the first and second toothing to selectively release and fix a predetermined angular position of the tool plate at any of a plurality of positions thereof; and centering means operatively connected with the stop means for locking the tool plate in the predetermined angular position and including:

a radial recess formed in the support body, a pin movable reciprocally radially in the recess and formed with a free-end contact surface having a variable radial cross-section, and a plurality of angularly spaced apart peripheral seats on the index disc each corresponding to a respective one of the plurality of positions of the tool plate, each seat being formed with a respective surface complementary to the contact surface of the pin and receiving said contact surface of said pin to arrest the index disc without a free play upon engaging the first and second rims in the predetermined angular position.

2. The tool-carrying turret defined in claim 1 wherein the free-end surface of the pin has a frustoconical surface facing the index disc and a cylindrical surface adjacent the frustoconical surface.

3. The tool-carrying turret defined in claim 1 wherein the stop means is mounted axially movable on the shaft and includes a plate formed with respective toothing intermeshing with the first and second toothings in said predetermined angular position.

4. The tool-carrying turret defined in claim 1 wherein the seats of the index disc are in phase with the first and second toothings.

5. The tool-carrying turret defined in claim 1 wherein the centering means further includes an electromagnet formed in said recess and actuating the pin.

* * * * *